United States Patent

[11] 3,576,983

[72] Inventor David S. Cochran
Palo Alto, Calif.

[21] Appl. No. 764,436
[22] Filed Oct. 2, 1968
[45] Patented May 4, 1971
[73] Assignee Hewlett-Packard Company
Palo Alto, Calif.

[54] DIGITAL CALCULATOR SYSTEM FOR COMPUTING SQUARE ROOTS
6 Claims, 2 Drawing Figs.

[52] U.S. Cl. ........ 235/158
[51] Int. Cl. ........ G06f 7/48
[50] Field of Search ........ 235/158

[56] References Cited

UNITED STATES PATENTS 3,049,296 8/1962 Hertz et al. ........ 235/158
3,267,267 8/1966 Clark ........ 235/158X
3,280,314 10/1966 Weigler ........ 235/158

*Primary Examiner*—Malcolm A. Morrison
*Assistant Examiner*—David H. Malzahn
*Attorney*—Stephen P. Fox

ABSTRACT: In a data processing system, a control unit is provided for controlling the functions and operational sequence of a memory unit and an arithmetic unit so as to derive the square root of any given number. The control system includes two iterative control loops, the first of which initially subtracts a predetermined subtrahend term from one-half of the given number. Thereafter this control loop successively subtracts an incrementally advanced subtrahend term from the difference formed by the immediately preceding subtraction operation. The second iterative control loop reduces the degree of significance of the subtrahend digits when the difference formed by a subtraction operation is negative. The number of positive differences formed by the first control loop are counted and these counts represent the square root of the given number.

INVENTOR.
DAVID S. COCHRAN
BY
AGENT

DIGITAL CALCULATOR SYSTEM FOR COMPUTING SQUARE ROOTS

BACKGROUND OF THE INVENTION

The heretofore known processes of deriving the square root of a number generally involve the successive formation of partial remainders from selected root extractors which are functions of previously derived square root digits. The root extractors are usually produced by a plurality of addition and multiplication steps. New partial remainders are obtained after a decision step which compares the last formed partial remainder and root extractor. A process of this type when implemented electronically, is often time consuming. It is preferable to be able to extract square roots by a less complex system incorporating lower order functions which will permit optimum use of electronic hardware and faster computation time.

SUMMARY OF THE INVENTION

The present invention relates to a system for controlling the sequence and operation of the arithmetic and memory units of a data processing machine to derive the square root of a given number in a simplified and efficient manner. The control system includes a plurality of memory cells and interrogation and output circuitry therefor. The memory cells store various signal combinations that in sequence constitute a program of operation for the memory and arithmetic units.

In accordance with the illustrated form of this program, the given number is first divided in half and becomes a minuend term. This term then has subtracted therefrom a subtrahend term, the least significant digit of which is always the number five. Two iterative control loop circuits are provided. The first of these consecutively advances from zero the next more significant digit to the immediate left of the 5 digit in the subtrahend term and subtracts this term from the minuend term after each digit advancement is made. This control loop also counts the number of subtractions performed for which the difference is positive. The second control loop circuit operates when the difference first becomes negative and stores in memory the counted number of preceding positive differences formed. The second control loop also restores the last positive difference formed and decreases the value of the subtrahend in two ways: first by decreasing all digits thereof 1° of significance and then by decreasing the 5 digit one additional degree of significance. Control is then returned to the first iterative loop circuit and successive differences between the minuend and advancing subtrahend terms are again formed. This operation is continued until a predetermined number of positive difference counts are stored, or alternatively until the subtrahend term is decreased to zero. The counted number of positive differences in the order derived and stored represent the successive digits, from left to right, of the square root of the given number.

DESCRIPTION OF THE PREFERRED EMBODIMENT

Figure 1:
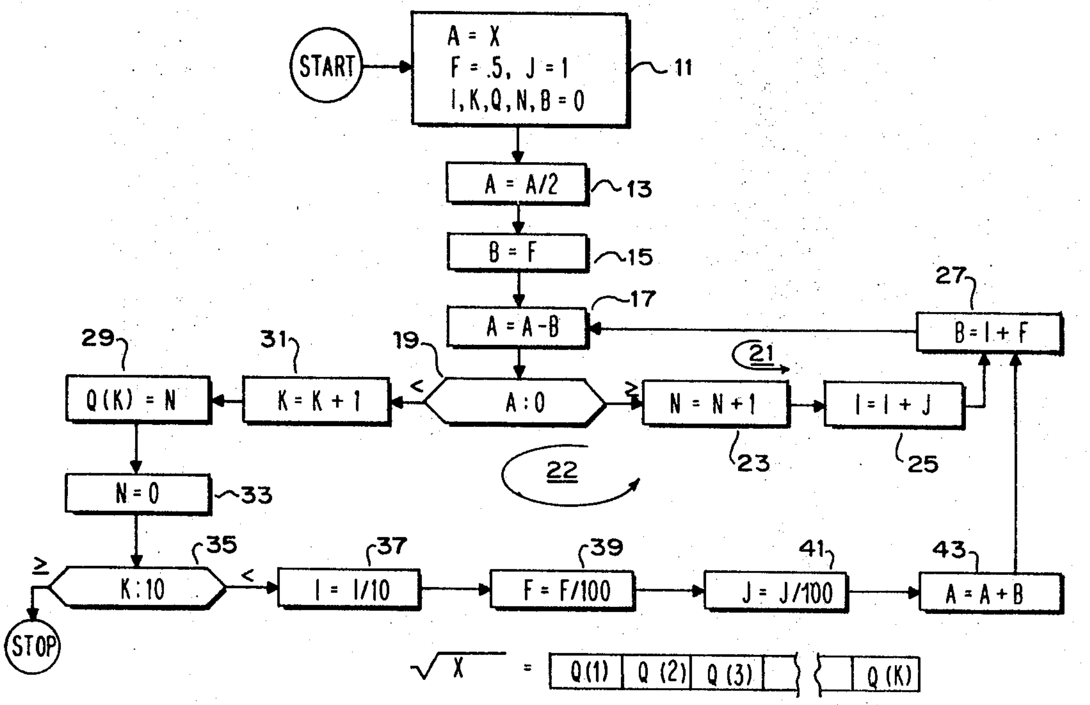
FIG. 1 of the drawing is a block diagram of a flow chart illustrating the sequence and functions of the control system of the present invention.

The control system of the present invention may best be understood by referring first to the sequence of functions produced thereby. With reference to FIG. 1, there is shown a block diagram employing conventional flow chart symbols. The various blocks represent processes performed and decisions made with respect to a number of variables used in extracting the square root of a given number designated by the letter X. The directing lines connecting one block to another illustrate the sequence of these processes and decisions.

Initially, the variables are set to the values shown in block 11. One of the variables A is set equal to the given number X, from which the square root is to be derived. Thereafter, A is divided in half by means represented by block 13. Another variable B is set equal to the number 5 designated by the term F as illustrated by block 15. In block 17, the variables A, B become minuend and subtrahend terms, respectively; then a subtraction is performed, and the resulting difference is substituted for the initial value of variable A. Block 19 compares the difference A with zero (as indicated by the colon) to determine whether A is positive or negative. If the difference A is positive, the system operation branches to a first iterative control loop 21, whereas if the difference is negative, the operation branches to a second iterative control loop 22.

In the first control loop 21, the immediately preceding positive difference term is counted. This is achieved by a counter block 23, wherein a variable N is augmented by 1 digit from its previous value, which initially is zero. Thereafter, in block 25 a variable I is formed from the sum of its previous value (initially zero) and a term J (initially one), the latter of which is constant for repetitive operations in control loop 21 and is changed by the second control loop 22, as hereinafter described. Block 27 forms a new subtrahend 108 B from the sum of I and F, and this term B is subtracted from the preceding difference term, which is now the new minuend term A.

Control loop 21 is repeated as long as the difference terms formed by block 17 are positive. Each repetition of this loop advances the counter block 23 by one count and also advances the subtrahend term B by one in the digit position which is next more significant than the digit number 0.5 thereof. Thus, for successive operations of control loop 21, the term B will have the values 0.5, 1.5, 2.5, 3.5..., so that successively larger numbers are subtracted from the difference A formed by the preceding subtraction operation.

When a negative difference is detected by the decision block 19, control is transferred to the second iterative control loop 22. Thereafter, the count N produced by the counter block 23 is stored by block 29 as a term Q(K) where K may be viewed as a subscript. The value of K is initially zero and is augmented by one in the block 31 each time control loop 22 is traversed and before the count N is stored. As will become apparent from the description hereinafter, the terms Q(1), Q(2), Q(3) ... represent the successive digits of the square root of the given number X. Following storage of the count N, this counter variable is reset to zero by block 33. A decision block 35 then compares the magnitude of K with a predetermined number, for example ten, which represents the total number of square root digits that are desired. If K is equal to this predetermined number, operation branches to "stop" which terminates the root extraction process.

If K has not yet reached the desired number of root digits, operation continues around control loop 22. The next steps encountered serve to decrease the degrees of significance of the digits in the subtrahend term B which was last formed by the first control loop 21. Specifically, the terms I and F from which B is formed are divided by 10 and 100, respectively, as represented by blocks 37 and 39. For example, if the last formed value of B was 2.5, next value of B will be 0.205. In effect, all digits are shifted right one position, and the least significant 5 digit is shifted right one additional position.

The next block 41 reduces the significance of the J term by a factor of one hundred. Thus whereas the previous value of J was 1.0, the new value of J is 0.01. As described hereinabove, J is constant for repetitive operations of the first control loop 21, so that the subtrahend term B will now be incremented by 0.01 each time the first control loop is traversed. In the above example where B has a value 0.205, the successive incremental values of B will be 0.215, 0.225, 0.235.... Finally, as shown by block 43, the last formed negative difference A is added to the last subtrahend B, so as to restore the positive difference which immediately preceded the first negative difference. Operation is then returned to the first control loop 21, wherein this positive difference is treated as the new minuend term A, a new subtrahend B is formed, and the processes of subtraction, counting and advancing the subtrahend digits are again repeated in succession until a negative difference is again detected by decision block 19.

Figure 2:
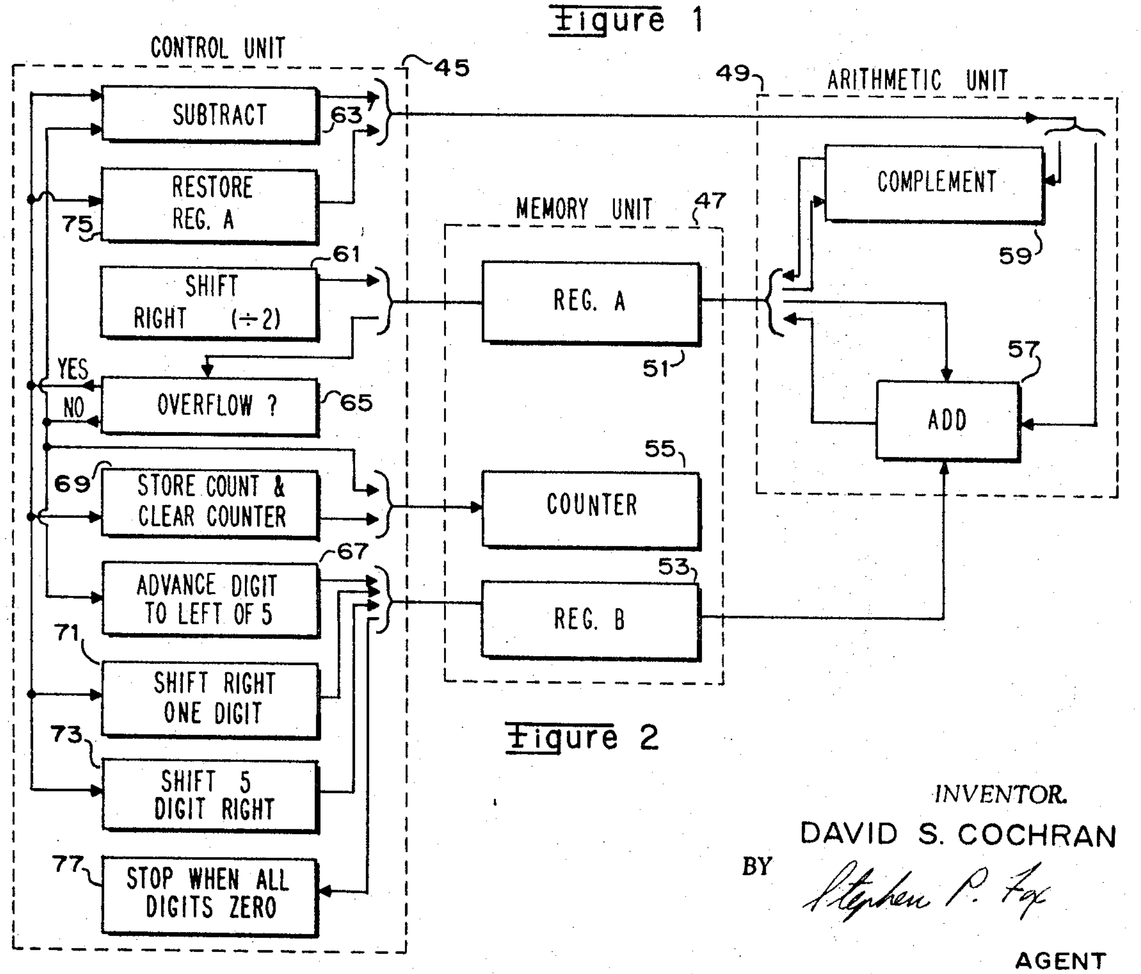
FIG. 2 of the drawing is a block diagram of the overall data processing system incorporating the control system of the present invention.

FIG. 2 illustrates a data processing system incorporating the control system of the invention. Control signals from a control unit 45 are transmitted in various combinations to a memory unit 47 and an arithmetic unit 49 to provide the functions and sequence thereof in accordance with the flow diagram of FIG. 1.

The illustrated components of the memory unit 47 and the arithmetic unit 49 are of the conventional type which may respond to binary coded decimal signals in floating point notation. Specifically, the memory unit 47 includes two registers 51, 53 for respectively storing the variables A and B as they are processed. Initially the given number X is entered in register A and the number 0.5 is entered in register B. A counter 55 provides the function of block 23 (FIG. 1) and also serves to store selected counts Q(K) in accordance with the functions of blocks 29, 31.

The arithmetic unit 49 includes an add unit 57 and a complement unit 59. The subtraction process of block 17 (FIG. 1) is performed by complementing the number in the A register 51, adding thereto the number in the B register 53 and storing the resulting difference in the A register. In repetitive operation of the first control loop 21, the number A need be complemented only once, and subsequent additions by the adder 57 are in effect subtractions. Adder 57 and complement unit 59 also perform the function of restoring the positive difference which immediately preceded a negative difference in register A, as represented by the block 43 of FIG. 1.

The number stored in the A register is actually the complement of the difference between the numbers previously contained in the A and B registers, i.e. $\overline{A-B}$, rather than the true difference value A—B. The difference A—B could be obtained by complementing the contents of register A; however, this would require that the contents of register A again be complemented before the next subtraction process is performed. In determining the square root, only the number of positive differences formed is used, rather than the difference value itself. Thus computation steps are conserved by complementing the contents of the A register only once before each series of subtraction operations, rather than complementing at the beginning and complementing again at the end of each subtraction operation. For purposes of the square root extraction process, the operation of the system of FIG. 2 achieves results equivalent to the subtraction operation A—B performed by the subroutine indicated by block 17 in FIG. 1 without the use of additional complementing steps.

The control unit 45 stores the control signal combinations and gates these signals by means of conventional logic circuitry. The various blocks of the control unit illustrated in FIG. 2 will now be described in the order of operation similar to that set forth in the flow diagram of FIG. 1. First, all of the digits in register A are shifted right one binary bit by control means 61. This operation divides the number in register A in half. Thereafter the control means 63 produces a subtract signal which causes the number in register A to be complemented and added to the number in register B. The resulting number from this operation is stored in register A. An overflow detecting means 65 then determines the sign of the difference term in register A. If an overflow digit is not detected, this difference is positive, and the overflow detecting means produces a series of different signals for (a) advancing the counter one digit form zero, (b) enabling a control means 67 which advances the next more significant digit to the left of the digit 0.5 in register B, and (c) enabling the subtract control means 63 to repeat a subtract operation. It can be seen that the three control means 63, 65, 67 together with the components of memory unit 47 and arithmetic unit 49 perform the functions of the first iterative control loop 21 in FIG. 1.

If the overflow detecting means 65 detects an overflow digit, thus indicating that the difference term in register A is negative, five sequential control signals are produced for (a) enabling a control means 69 which stores the count in counter 55 and resets this counter, (b) enabling a control means 71 which shifts all digits in the B register one significant digit position to the right, (c) enabling a control means 73 which shifts the 5 digit in register B one additional significant digit position to the right, (d) restoring the last positive difference by enabling a control means 75 which causes the contents of registers A and B to be added and stored in register A, and then (e) returning operation to the first iterative control loop by enabling the subtract control means 63. It can be seen that the control means 65, 69, 71, 73, 75 together with the memory and arithmetic units perform the functions of the second iterative control loop 22 of FIG. 1.

An additional stop control means 77 is provided for monitoring the contents of register B and terminating the system operation when all digits in register B are zero. The stop control means 77 of FIG. 2 is analogous to the decision block 35 of FIG. 1 except that in the former, operation is stopped after the number in register B has been incrementally decreased to a value smaller than the capacity of the register, whereas in decision block 35, operation is stopped after a predetermined number of square root digits are derived.

In the system of FIG. 2, the subtrahend digits in register B are shifted to the right off the end of the register until the contents of the register are zero. Thus these digits are lost in the computation process. However, had the subtrahend digits from register B been retained in memory, they would have represented the square root of the number X. Thus the square root would appear in both the counter memory and in the subtrahend register.

The overall operation of the system of FIG. 2 is illustrated by the following example wherein the contents of the registers A and B and the counter are given for each step of the control system sequence in extracting the square root of the number 576. In floating point notation this number is represents as $5.76\times10^2$; however, the exponential terms are omitted from the table in order to simplify the example.

| Step | Register A | Register B | Counter |
|---|---|---|---|
| Initial conditions | 5.76 | 0.500 | 0 |
| 1. Divide by 2 | 2.88 | | |
| 2. Compl. A, add B to A | 7.61 | | |
| 3. Overflow? No | | | |
| 4. Advance B and count | | 1.500 | 1 |
| 5. Add B to A | 9.11 | | |
| 6. Overflow? No | | | |
| 7. Advance B and count | | 2.500 | 2 |
| 8. Add B to A | [1] 1.61 | | |
| 9. Overflow? Yes | | | |
| 10. Restore: Compl. A, add B to A, compl. A | 9.11 | | |
| 11. Store count and clear | | | 2·0 |
| 12. Shift B right | | 0.250 | |
| 13. Shift "5" right | | 0.205 | |
| 14. Add B to A | 9.315 | | |
| 15. Overflow? No | | | |
| 16. Advance B and count | | 0.215 | 2·1 |
| 17. Add B to A | 9.530 | | |
| 18. Overflow? No | | | |
| 19. Advance B and count | | 0.225 | 2·2 |
| 20. Add B to A | 9.755 | | |
| 21. Overflow? No | | | |
| 22. Advance B and count | | 0.235 | 2·3 |
| 23. Add B to A | 9.990 | | |
| 24. Overflow? No | | | |
| 25. Advance B and count | | 0.245 | 2·4 |
| 26. Add B to A | [1] 0.235 | | |
| 27. Overflow? Yes | | | |
| 28. Repeat from step 10 and continue until Reg. B=0.000 | | | 2· 4 |

Step Register A Register B Counter

In the above table, the two steps following a step where no overflow is detected in the A register are performed by the first iterative control loop 21 (FIG. 1), and the five steps following detection of an overflow digit are performed by the second iterative control loop 22. The overflow digits are those to the left of the bracket in steps 8 and 26, for example. At the conclusion of the process, the square root of the given number is represented from the most significant digit to the least significant digit by the succession of counts stored from the counter. In the above example the stored counts are represented by the numbers inside of the squares. It can be seen from the above example that after converting from floating point notation, the square root of 576 is 24. As noted hereinabove, the square root is also represented by the retained digits from register B (disregarding the least significant 5 digit).

I claim:

1. In a data processing system including control, memory and arithmetic units, means for transferring data signals between said memory and arithmetic units, and means for transferring control signals among said control, memory and arithmetic units, a system for extracting the square root of a given positive number comprising:

first means for storing a first number initially equal to one-half of said given number;

second means for storing a second number the least significant digit of which is the digit five;

first iterative means including:

means coupled to said first and second storing means for forming successive differences of said first and second numbers;

means for indicating whether each said difference formed is positive or negative;

means coupled to said indicating means and operable when a positive difference is indicated for incrementally increasing said second number to the next consecutive digit, starting from zero, in the digit position of said second number which is next more significant than said least significant digit;

means coupled to said indicating means for counting the number of positive differences formed;

second iterative means including:

means responsive to the first negative difference following a succession of positive differences for storing the count of said counting means as a root digit and for resetting said counting means to zero;

means responsive to the first negative difference following a succession of positive differences for restoring the positive difference immediately preceding said first negative difference;

means coupled to said second means for storing said second number and operable after said positive difference is restored for decreasing all digits of the last value of said incrementally increased second number by 1° of significance;

means coupled to said second means for storing said second number and operable after the digits of said second number are decreased by 1° of significance for decreasing said least significant digit five of said second number by one additional degree of significance; and means coupled to said difference forming means and operable after said last named decreasing means for returning operation to said first iterative means;

whereby the square root of said given number is represented from the most significant to the least significant digit by the succession of counts stored by said counter means.

2. The system of claim 1, further including means responsive to a predetermined number of counts in said storing means for stopping operation of said first and second iterative means.

3. The system of claim 1, said positive difference restoring means including means for controlling said difference forming means to add said first negative difference to the last formed one of said incrementally increased second numbers.

4. In a data processing machine a system for extracting the square root of a given number comprising:

a first storage register initially containing said given number;

a second storage register initially containing the digit five in the least significant digit position;

digit shifting means for dividing the contents of said first storage register in half;

first iterative means including:

means coupled to said first and second storage registers for obtaining the difference between the numbers in said storage registers and for storing said difference in said first storage register;

means coupled to said first storage register for detecting overflow of said first storage register to indicate whether said difference is positive or negative;

means coupled to said overflow detecting means and operable each time a positive difference is indicated for consecutively advancing from zero the digit in the position next more significant than the digit five in said second storage register; and means coupled to said overflow detecting means for counting each positive difference entered into said first storage register;

second iterative means operable after the first time said overflow detecting means indicates a negative difference in said first storage means, said second iterative means including:

means for storing the count of said counting means and for setting said counting means to zero;

means for restoring said first storage register to the positive difference which immediately preceded said first negative difference;

means operable after said possible difference is restored for decreasing the significance of all digits in said second storage register by one digit position;

means operable after the digits in said second storage register are decreased by one degree of significance for decreasing the significance of said digit five in said second storage register by an additional digit position;

means coupled to said difference obtaining means and operable after said last-named digit decreasing means for returning operation to said first iterative means;

whereby the square root of said given number is represented from the most significant to the least significant digit by the succession of stored counts from said counting means.

5. The square root extracting system of claim 4, including means common to said difference obtaining means and said restoring means for complementing the contents of said first storage register and for adding the contents of said first and second storage registers.

6. The square root extracting system of claim 4, further including means for stopping the operation of said system when all digits in said second storage register are zero.

UNITED STATES PATENT OFFICE
CERTIFICATE OF CORRECTION

Patent No. 3,576,983 Dated May 4, 1971

Inventor(s) David S. Cochran

It is certified that error appears in the above-identified patent and that said Letters Patent are hereby corrected as shown below:

Column 2, line 5, "number 5" should read -- number 0.5 line 23, "subtrahend 108 B" should read -- subtrahend term Column 4, in the table beginning at line 40, correct Steps 8, 11, 16, 19, 22, 25, 26 and 28 as follows:

| Step | | Register A | Register B | Counter |
|---|---|---|---|---|
| 8. | Add B to A------- | 1⌋ 1.61 | ---------- | ---------- |
| 11. | Store count and clear------------ | | ---------- | [2].0 |
| 16. | Advance B and count------- | | 0.215 | [2].1 |
| 19. | Advance B and count------- | | 0.225 | [2].2 |
| 22. | Advance B and count------- | | 0.235 | [2].3 |
| 25. | Advance B and count------- | | 0.245 | [2].4 |
| 26. | Add B to A------ | 1⌋ 0.235 | ---------- | ---------- |
| 28. | Repeat from step 10 and continue until Reg. B = 0.000 | | ---------- | [2].[4] |

Reference to the brackets in Steps 8 and 26 appears in colu line 74, and reference to the numbers inside the squares in Steps 11, 16, 19, 22, 25 and 28 appears in column 5, line 4

Signed and sealed this 19th day of October 1971.

(SEAL)
Attest:

EDWARD M.FLETCHER,JR. ROBERT GOTTSCHALK
Attesting Officer Acting Commissioner of Pat